United States Patent [19]

Suzuki

[11] 4,217,615
[45] Aug. 12, 1980

[54] TAPE MEASUREMENT AND POSITION SYSTEM

[75] Inventor: Tsutomu Suzuki, Tokorozawa, Japan

[73] Assignee: Pioneer Electronic Corporation, Tokyo, Japan

[21] Appl. No.: 8,811

[22] Filed: Feb. 2, 1979

[30] Foreign Application Priority Data

Feb. 2, 1978 [JP] Japan .................................. 53-11071
Feb. 2, 1978 [JP] Japan .................................. 53-11072

[51] Int. Cl.² ........................ G11B 15/00; G03B 1/60
[52] U.S. Cl. ..................................... 360/137; 352/170
[58] Field of Search ................... 360/132, 137, 96.1, 360/96.2; 352/172, 170; 242/205

[56] References Cited

U.S. PATENT DOCUMENTS

| | | | |
|---|---|---|---|
| 4,003,093 | 1/1977 | Satoh | 360/137 |
| 4,014,043 | 3/1977 | Yoshii | 360/137 |
| 4,044,233 | 8/1977 | Sato | 360/137 |
| 4,140,896 | 2/1979 | Robertson | 360/137 |

Primary Examiner—Daryl W. Cook
Attorney, Agent, or Firm—Sughrue, Rothwell, Mion, Zinn and Macpeak

[57] ABSTRACT

A system for measuring tape thickness, instantaneous position and the entire length of the tape uses encoders on the supply and take-up reels to measure rotation rate. Counters actuating various multivibrators are used to determine a predetermined number of revolutions. Instantaneous position and thickness data are produced using data taken from take-up reel rotation and entire length data uses additional rotation data from the supply reel. Encoder outputs from reel rotation are counted to ultimately produce pulses for every third revolution of the reels. An oscillation pulse train of predetermined frequency is divided and counted by a binary counter reset by a gate circuit producing exclusive logic sums of multivibrator outputs of each and every third revolution. The counter output is provided to a latch circuit. By comparison and computation, the various outputs are obtained.

17 Claims, 4 Drawing Figures

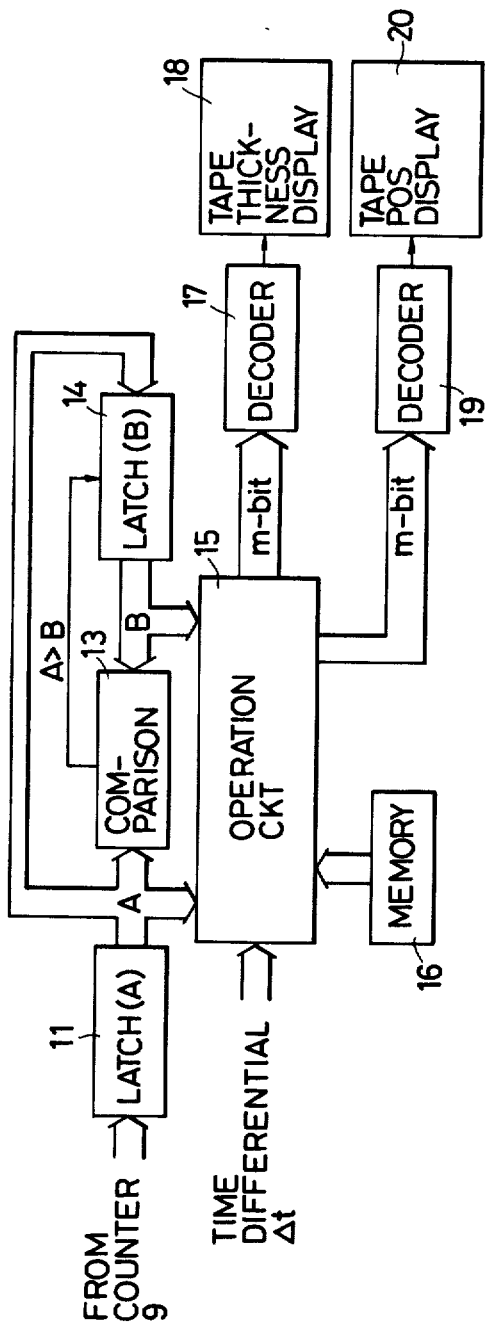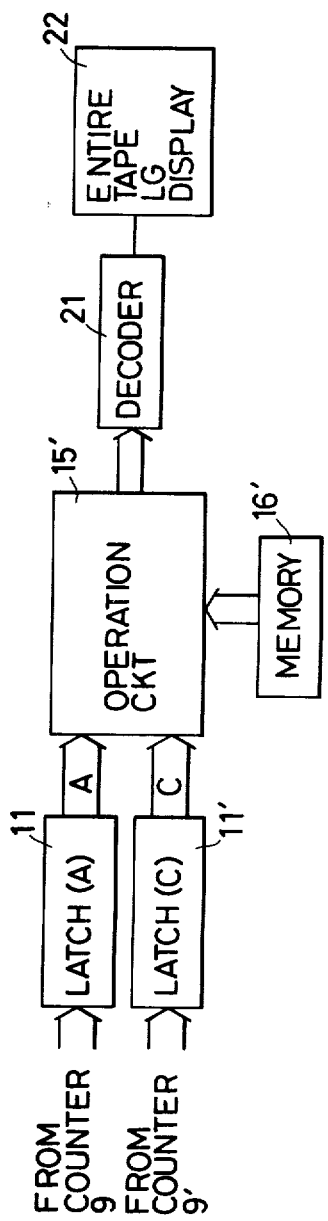

TAPE MEASUREMENT AND POSITION SYSTEM

BACKGROUND OF THE INVENTION

This invention relates to an apparatus for the equipment to a tape recorder and more particularly, to an apparatus provided with three functions: automatically detect tape thickness, measure the entire length of the tape, and determine the instantaneous position of the tape between a supply reel and a take-up reel in a tape recorder.

Cassette tapes can be classified according to the thickness into three kinds, i.e. 18μ, 12μ, and 9μ, and according to the entire length of the tape into five kinds, i.e. C-30, C-46, C-60, C-90 and C-120. Tapes for open reels to be employed in a reel-to-reel type tape recorder can be classified according to the thickness into three kinds, i.e. 50μ, 35μ and 25μ. It would be convenient if an apparatus is provided in the tape recorder, which automatically detects the tape thickness and the entire length of the tape.

A tape counter has been conventionally employed in a tape recorder for knowing the instantaneous position of the tape between a supply reel and a take-up reel. It is, however, impossible to known accurately tape position by the conventional counter, because such a counter is operated mechanically.

SUMMARY OF THE INVENTION

Accordingly, an object of this invention is to provide an apparatus, in which the tape kinds, i.e. the tape thickness and the entire length of the tape, and the instantaneous tape position are automatically detected.

These and other objects of this invention are accomplished in a system for measuring tape thickness, instantaneous position and the entire length of the tape uses encoders on the supply and take-up reels to measure rotation rate. Counters actuating various multivibrators are used to determine a predetermined number of revolutions. Instantaneous position and thickness data are produced using data taken from take-up reel rotation and entire length data uses additional rotation data from the supply reel. Encoder outputs from reel rotation are counted to ultimately produce pulses for every third revolution of the reels. An oscillation pulse train of predetermined frequency is divided and counted by a binary counter reset by a gate circuit producing exclusive logic sums of multivibrator outputs of each and every third revolution. The counter output is provided to a latch circuit. By comparision and computation, the various outputs are obtained. The system operates on either reel-to-reel or cassette type tapes, both employing supply and take-up reels.

BRIEF DESCRIPTION OF THE DRAWINGS

In the drawings:

FIGS. 1 and 3 are circuitry block diagrams showing the apparatus for detecting the tape kinds and the instantaneous tape position according to one embodiment of the present invention;

FIG. 4 is a block diagram showing the apparatus for detecting the entire length of the tape according to the embodiment of this invention.

DETAILED DESCRIPTION OF THE PREFERRED EMBODIMENT

One embodiment according to the present invention will now be described with reference to the accompanying drawings.

Figure 1:
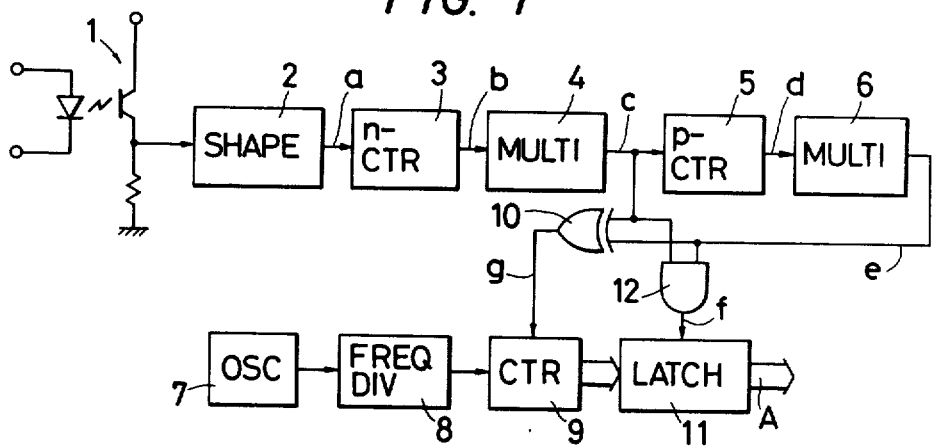
Figure 2:
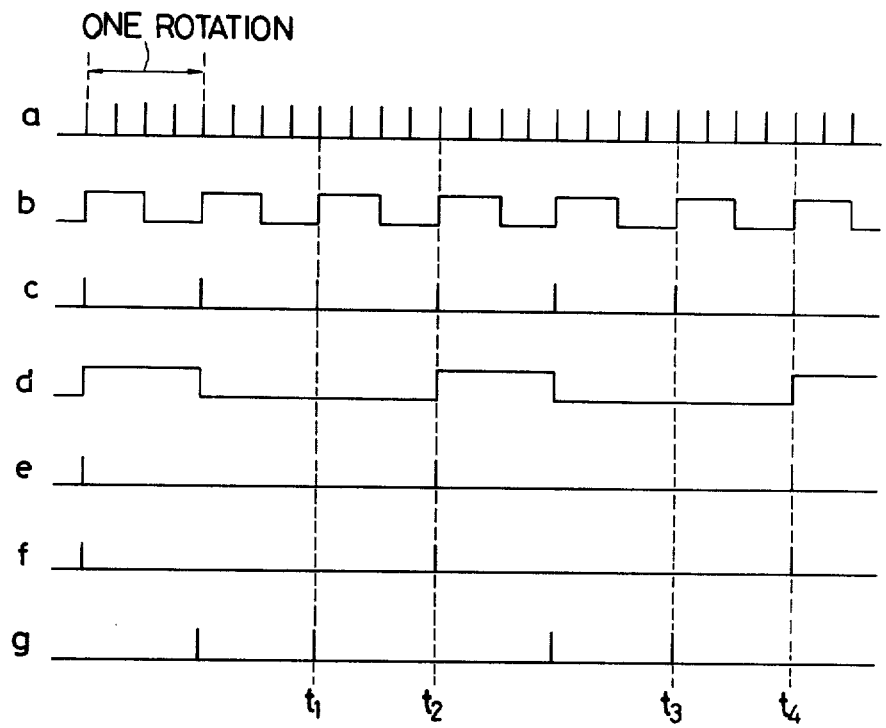
FIG. 2, including a–g, is a diagram showing the waveforms of each section shown in FIG. 1.

FIGS. 1 and 3 are circuitry block diagram showing one embodiment of the present invention for measuring thickness and instantaneous position and FIG. 2 is a diagram showing output waveforms of each section shown in FIG. 1. Referring to FIG. 1, there is provided a photo interrupter 1 for optically detecting the rotational speed of a take-up reel. Provided between a light emitting element and a light receiving element of the photo interrupter 1 is a rotation encoder disc (not shown) coaxially secured to a reel spindle and rotatable in accordance with a reel stand. Slits are formed on the rotation encoder disc so that a pulse signal is produced in the output of the photo interrupter 1, with the frequency of the pulse signal depending on the rotational speed of the reel stand or the rotation disc.

The pulse signal thus produced is shaped and amplified by a waveform shaping circuit 2 thereby producing an output signal a. As shown in FIG. 2(a), this invention is configured so that four pulses are obtained for every single rotation of the rotation encoder disc. The pulse signal a is counted by n-counting digital counter 3, in this embodiment a four-counting digital counter, to obtain pulse waveform b. Specifically, the pulse is produced at the output of the counter 3 at every one rotation of the reel.

The pulse b is then applied to the input of a monostable multivibrator 4. The multivibrator 4 is triggered at the instant of receipt of the input pulse and one output pulse will be produced at the initiation of every rotation of the rotation encoder disc as shown in FIG. 2(c).

The output c of the mono-stable multivibrator 4 is applied to the input of a p-counting digital counter 5, e.g., a three-count digital counter. Therefore, the counter 5 produces one pulse as its output d at every third rotation of the reel stand or the rotation encoder disc. The output d of the counter 5 is further applied to the input of a mono-stable multivibrator 6, which is also triggered at the instant of receipt of the input pulse. Accordingly, the mono-stable multivibrator 6 produces one pulse at the initiation of every third rotation of the reel stand or the rotation encoder disc as shown in FIG. 2(e).

An oscillation circuit 7 is provided, which generates a pulse train at a predetermined frequency. The output pulses of the oscillation circuit 7 are applied through a frequency divider circuit 8 to the input of a binary counter 9. The binary counter 9 is reset by the output g of a gate circuit 10 which produces an exclusive logic sum signal of the outputs c and e of the mono-stable multivibrators 4 and 6, respectively.

The counter 9 generates an m-bit parallel digital output which is applied to the input of a latch circuit 11 to thereby implement the parallel storage of the m-bit digital signal. A read-in instruction signal of the latch circuit 11 is the output f of a gate circuit 12 which provides as its output a logic product signal of the outputs c and e of the mono-stable multivibrators 4 and 6, respectively.

Accordingly, the binary counter 9 is reset by the reset signal g of the gate circuit 10 at the time $t_1$ and counts the number of the pulse train of a predetermined frequency processed from the frequency divider circuit 8.

In response to the read-in instruction signal f of the gate circuit 12 at the time $t_2$, the latch circuit 11 is subjected to the m-bit parallel input of the content of the counter 9, and the content of the counter 9 is stored until it receives the instruction signal f at the time $t_4$. The latch circuit 11 stores the content of the binary counter 9 between time $t_1$ and $t_2$, which is the number of the output pulses of the frequency divider circuit 8 produced during one rotation of the reel stand. The content stored in the latch circuit 11 corresponds exactly to the time period for one rotation of the reel stand, since the output pulses of the frequency divider circuit 8 is a predetermined frequency and the duration between time $t_1$ and $t_2$ is in inverse proportion to the rotational speed of the reel stand.

Similarly, for each three-rotation of the reel stand, the content corresponding to the time period between $t_3$ and $t_4$ for one rotation thereof is stored in the latch circuit. Accordingly, the latch circuit 11 functions to read in and store the signals correponding to the time period for one rotation of the reel stand at each known period of time. In this embodiment, the signal is read in and stored at for each three-rotation of the reel stand.

The m-bit parallel digital output A of the latch circuit 11 is, as shown in FIG. 3, applied to both an m-bit parallel signal comparision circuit 13 and an m-bit latch circuit 14. The other input to the comparison circuit 13 is the output B of the latch circuit 14. The outputs A and B of the latch circuit 11 and 14, respectively, are compared, and only in the case where the output A is greater than the output B, the stored content A of the latch circuit 11 is read into the latch circuit 14. Accordingly, the latch circuit 14 stores the preceding maximum value at all times. Specifically, the latch circuit 14 stores the content B at the time $t_2$ identifying the time period $n_t$ for one rotation of the take-up reed while the latch circuit 11 stores the content A at the time $t_4$ identifying the time period $n_{(t+\Delta t)}$ therefor. These outputs A and B of both the latch circuits are applied to the input of an operation circuit 15.

Assuming that the diameter of the tape wound on the take-up reel is $R_t$ at the time instant t and the diameter of the tape wound after a predetermined period of time $\Delta t$ changes to $R_{(t+\Delta t)}$, the thickness of the tape can be discriminated by accurately measuring the time for one rotation of the take-up reel. Because the diameter of the tape wound after the predetermined period of time is different depending on the thickness of the tape, accordingly the time for one rotation of the take-up reel is different depending on tape thickness.

Assuming, that the time t has passed immediately after the commencement of the tape winding to the take-up reel, the tape winding number in the take-up reel is $N_t$ and the diameter of the wound tape therein is $R_t$, the tape winding number $N_t$ can be expressed by the following equation:

$$\pi R_H + \pi(R_H+2T) + \pi(R_H+4T) + \ldots + \pi(R_H+2N_tT) = v \cdot t \quad (1)$$

where $R_H$ is the diameter of a hub, T is the thickness of the tape and assuming that v is the tape running velocity, 4.75 cm/sec.

By rearranging equation (1), the following equation can be obtained:

$$(N_t+1)(N_tT+R_H) = v \cdot t/\pi \quad (2)$$

Since the relationship of $N_t=(R_t-R_H)/2T$ and $R_t=v \cdot n_t/\pi$ is established, $N_t$ can be represented by the following equation:

$$N_t=(v \cdot n_t - \pi R_H)/2\pi T \quad (3)$$

By substituting equation (2) for equation (3) and by rearranging, the following equation can be obtained:

$$v \cdot t = (v \cdot n_t - \pi R_H + 2\pi T)(v \cdot n_t + \pi R_H)/4\pi T \quad (4)$$

Similarly, equation (4) can be expressed by the following equation in the case where a predetermined period of time $\Delta t$ passes after the time t:

$$v(t+\Delta t) = (v \cdot n_{t+\Delta t} - \pi R_H + 2\pi T)(v \cdot n_{t+\Delta t} + \pi R_H)/4\pi T \quad (5)$$

In the above equations (4) and (5), $\Delta t$, $n_t$ and $n_{t+\Delta t}$ are measured and obtained as the time differential of time $t_2$ and $t_4$ (FIG. 2), the output B of the latch circuit 14 and the output A of the latch circuit 11, respectively, as described hereinbefore with reference to FIGS. 1 and 3. Since both $R_H$ and v are constant, equations (4) and (5) constitute simultaneous equations in which the time t and the thickness T are unknown quantities.

Referring back to FIG. 3, the diameter $R_H$ of the hub and the tape velocity v are provided as outputs of a memory circuit 16 and are applied to the operation circuit 15, and further the time differential $\Delta t(t_4-t_2)$ are applied as an input to the operation circuit 15 in the form of m-bit digital signal. By employing the outputs A and B of the latch circuits, the above-mentioned simultaneous equations can be solved. That is, the tape thickness T and the time t measured from the the initiation of the tape winding can be obtained by the following equations:

$$T=(n^2_{t+\Delta t}-n_t^2) \cdot v/2\pi(n_t-n_{t+\Delta t}+2 \cdot \Delta t) \quad (6)$$

$$t=(v \cdot n_t + \pi R_H)\{(n_{t+\Delta t}-n_t)(\pi R_H + v \cdot n_{t+\Delta t}) + 2\pi \cdot \Delta t \cdot (-v \cdot n_t - \pi R_H)\}/2v^2(n^2_{t+\Delta t}-n^2_t) \quad (7)$$

On the basis of the above equations (6) and (7), the tape thickness T and the time $t+\Delta t$ can be calculated in the operation circuit 15.

The tape thickness T thus obtained is outputted by way of the m-bit parallel digital signal, and a tape thickness displaying device 18 is driven by a decoder 17. Additionally, by producing the tape running velocity v (=4.75 cm/sec) to the time t or to the time $t+\Delta t$, the tape length measured from the initial position can be calculated. The instantaneous position of the tape is established by applying the m-bit parallel digital signal to the input of a decoder 19 to thereby drive a tape instantaneous display device 20.

Next will be described the situation where the measurement of the entire length of the tape takes place. In order to measure the time period for one rotation of a supply reel, the identical circuit to that shown in FIG. 1 is provided at the supply reel. Therefore, a second measurement of reel rotation takes place at the supply reel and the signals are processed in an identical manner to that shown in FIG. 1. As a result, one input will be from a counter 9' at the supply reel side, identical to counter 9. The time $n_s$ for one rotation of the supply reel at the time instant t is stored in a latch circuit 11'.

Assuming that the entire length of the tape is L, the winding number of the supply reel is $N_s$ and the diameter of the tape wound in the supply reel is $R_s$, the following equation can be established:

$$\pi R_H + \pi(R_H+2T) + \pi(R_H+4T) + \ldots \\ + \pi(R_H+2N_rT) + \pi R_H + \pi(R_H+2T) + \pi(R_H+4T) + \ldots + \pi(R_H+2N_rT) = L \quad (8)$$

By rearranging the above equation (8), the following can be obtained:

$$(N_s+N_i)(R_H+T) + T(N_s^2+N_i^2) = L/\pi - 2R_H \quad (9)$$

Since the relationship of $N_s=(R_s=R_H)/2T$ and $R_s = v \cdot n_s/\pi$, $N_s$ exist, these can be represented by the following equation:

$$N_s = (v \cdot n_s - \pi R_H)/2\pi T \quad (10)$$

By substituting equations (10) and (3) for equation (9), the following equation can be obtained:

$$v^2(n_s^2+n_t^2) + 2\pi v(n_s+n_t) \cdot t = 4\pi \cdot T \cdot L - 4\pi R_H^2 \cdot T + 2\pi^2 R_H^2 \quad (11)$$

Since $2\pi^2 R_H^2 >> 4\pi R_H^2 \cdot T$ and $v^2 \cdot (n_s^2+n_t^2) >> 2\pi v(n_s+n_t) \cdot T$, the entire tape length L can be expressed by the following equation:

$$L = \{v^2(n_s^2+n_t^2) - 2\pi^2 R_H^2\}/4\pi T \quad (12)$$

In the above equation (12), v, $R_H$ and $\pi$ are constant; therefore, as shown in FIG. 4, this data information are read-out from the memory circuit 16' to the operation circuit 15', and the time $n_t$ and $n_s$ representing the time periods for one rotation of the take-up and supply reels are introduced as the data A and C from the latch circuit 11 and 11', respectively. Further, by utilizing the tape thickness T obtained through FIG. 3, the operation in accordance with the equation (12) is implemented in the operation circuit 15. The digital signal obtained by this operation is decoded by a decoder 21 to thereby drive a tape entire length displaying device 22.

The circuitry used to form the elements shown in FIGS. 1, 3 and 4 is well known and need not be described in detail. For example, the counters, oscillators monostable devices, latch elements and decoders can employ standard TTL implementation. The operation circuits 15 and 15' used to perform the computing functions can be implemented by using a micro processor of the type μCOM-43 series manufactured by Nippon Electric Company or a Texas Instruments type TMS 1300.

As described in detail, according to the present invention, it is possible to discriminate the tape thickness and to accutately measure the entire length of the tape by simply measuring the time period for one rotation or a predetermined number of rotations of the tape reel between the two different time instants. It is further possible according to the present invention to accurately detect the instantaneous position of the running tape. The apparatus according to the present invention is advantageous in that the accuracy of the detection thereof is greatly enhanced and the components to construct the circuits are commercially available.

While one preferred embodiment of this invention has been shown it is apparent that modifications can be made without departing from the essential scope and teaching thereof.

What is claimed is:

1. A system for detecting tape parameters used in a tape recorder wherein the tape is transferred from a first reel to a second reel at a running velocity v, comprising:
   (a) measuring means for measuring a time period for a predetermined number of rotations of one reel having a hub diameter $R_H$;
   (b) first memory means for storing a first time period $n_t$ at a time t measured by said measuring means;
   (c) second memory means for storing a second time period $n_{t+\Delta t}$ at a time $t+\Delta t$ measured by said memory means; and
   (d) computing means for operating with said first and second time periods $n_t$ and $n_{t+\Delta t}$, a time differential $\Delta t$ between the time $t+\Delta t$ and t and the tape running velocity v in accordance with the following equation:

$$T = (n_{t+\Delta t}^2 - n_t^2) \cdot v/2\pi(n_t - n_{t+\Delta t} + 2\Delta t)$$

to thereby calculate tape thickness T.

2. The system of claim 1 wherein said computing means further operates on said first time period $n_t$ and said second time period $n_{t+\Delta t}$, a time differential $\Delta t$ between the time $t+\Delta t$ and t, the tape running velocity v and the reel hub diameter $R_H$ in accordance with the following equation:

$$t = (v \cdot n_t + \pi R_H)\{(n_{t+\Delta t}-n_t)(\pi R_H + v \cdot n_{t+\Delta t}) + 2\pi \cdot \Delta t(v \cdot n_t - \pi R_H)\}/2v^2(N_{t+\Delta t}^2 - n_t^2)$$

to thereby calculate instantaneous tape position from initiation of winding.

3. The system of claim 2 further comprising; third memory means for storing a third time period $n_s$ at the time t measured by said second measuring means; and second computing for operating with said tape thickness T calculated by said first computing means, said first and third time periods $n_t$ and $n_s$, the diameter of the reel hub $R_H$ and the tape velocity v in accordance with the following equation:

$$L = \{v^2(n_s^2+n_t^2) - 2\pi^2 R_H^2\}/4\pi T$$

to thereby calculate the total tape length L.

4. A system for detecting tape parameters used in a tape recorder wherein the tape is transferred from a first reel to a second reel at a running velocity v and a diameter of a reel hub $R_H$, comprising:
   (a) first measuring means for measuring a time period for a predetermined number of rotations of the first reel;
   (b) second measuring means for measuring a time period for a predetermined number of rotations of the second reel;
   (c) first memory means for storing a first time period $n_t$ at a time t measured by said first measuring means;
   (d) second memory means for storing a second time period $n_{t+\Delta t}$ at a time $t+\Delta t$ measured by said first measuring means;
   (e) third memory means for storing a third time period $n_s$ at the time t measured by said second measuring means;
   (f) first computing means for operating said first and second time periods $n_t$ and $n_{t+\Delta t}$, a time differential $\Delta t$ between the time $t+\Delta t$ and $t$ and the tape running velocity v in accordance with the following equation:

$$T=(n_{t+\Delta t}^2 - n_t^2)v/2\pi(n_t - n_{t+\Delta t} + 2\cdot\Delta t)$$

to thereby calculate the tape thickness T; and (g) second computing means for operating said tape thickness T calculated by said first computing means, said first and third time period $n_t$ and $n_s$, the diameter of the reel hub $R_H$ and the tape velocity v in accordance with the following equation:

$$L=\{v^2(n_s^2 + n_t^2) - 2\pi^2 R_H^2\}/4\pi T$$

to thereby calculate the entire tape length L.

5. The system of claims 1, 2, 3 or 4 wherein said first measuring means comprises means producing a pulse signal indicative of reel rotation, and a shaping circuit to produce a multiple number of output pulses for each rotation.

6. The system of claim 5 wherein four pulses are produced for each revolution of said reel.

7. The system of claim 4 further comprising a first counter to count said multiple output pulses and deliver an output waveform, first multivibrator means responsive to said output waveform to produce a trigger pulse for each rotation of said reel, and a second counter to count a predetermined number of trigger pulses and produce a second output waveform.

8. The system of claim 7 wherein said second counter produces an output waveform for each third revolution of said reel.

9. The system of claim 7 further comprising second multivibrator means responsive to said second output waveform to produce a trigger pulse for every third revolution of said reel, an oscillation circuit delivering a pulse train at a predetermined frequency, a binary counter receiving said pulse train and logic means responsive to the outputs of said first and second multivibrators to reset said binary counter.

10. The system of claim 9 wherein said logic means produces an exclusive logic sum signal of the outputs of said first and second multivibrator means.

11. The system of claim 9 further comprising a frequency divider interposed between said oscillation circuit and said binary counter.

12. The system of claim 9 wherein said first memory means comprises a first latch circuit.

13. The system of claim 12 wherein said logic means produces a latch read-in instruction signal as the logic product of the outputs of said first and second multivibrator means.

14. The system of claims 1, 2, 3 or 4 wherein said first memory means is a latch circuit.

15. The system of claim 14 further comprising a comparison circuit and wherein said second memory means is a second latch circuit.

16. The system of claims 3 or 4 wherein said second measuring means comprises means producing a pulse signal indicative rotation of said second reel, and a second shaping circuit to produce a multiple number of output pulses for each rotation.

17. The system of claim 16 wherein said third memory means comprises a latch circuit.

* * * * *